(12) United States Patent  
Carroll et al.

(10) Patent No.: US 11,798,158 B2  
(45) Date of Patent: Oct. 24, 2023

(54) SYSTEMS AND METHODS FOR MONITORING CHAIN HEALTH

(71) Applicant: GM GLOBAL TECHNOLOGY OPERATIONS LLC, Detroit, MI (US)

(72) Inventors: Dennis J Carroll, Leander, TX (US); Paerhati Remutula, Limerick (IE); Philip L Griggs, Troy, MO (US); Sai Rohit Kumar Danda, Dublin (IE); Minchao Zhu, Dublin (IE); Avinash Gunda, Dublin (IE); Jason P Joye, Macomb, MI (US); David R Kracko, Dewitt, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 142 days.

(21) Appl. No.: 17/455,149

(22) Filed: Nov. 16, 2021

(65) Prior Publication Data

US 2023/0153985 A1 May 18, 2023

(51) Int. Cl.

| | |
|---|---|
| *G06T 7/00* | (2017.01) |
| *G06T 7/70* | (2017.01) |
| *G06T 5/00* | (2006.01) |
| *G08B 21/18* | (2006.01) |
| *G01M 13/023* | (2019.01) |
| *G06V 20/60* | (2022.01) |

(52) U.S. Cl.  
CPC ........... *G06T 7/001* (2013.01); *G01M 13/023* (2013.01); *G06T 5/007* (2013.01); *G06T 7/0008* (2013.01); *G06T 7/70* (2017.01); *G06V 20/60* (2022.01); *G08B 21/187* (2013.01); *G06T 2207/30164* (2013.01)

(58) Field of Classification Search  
None  
See application file for complete search history.

(56) References Cited

U.S. PATENT DOCUMENTS

| | | | |
|---|---|---|---|
| 2002/0078675 A1* | 6/2002 | Matsuda | F16G 13/04 59/5 |
| 2006/0124741 A1* | 6/2006 | Mayer | B42D 25/391 235/454 |
| 2012/0260277 A1* | 10/2012 | Kosciewicz | H04N 17/004 725/31 |
| 2018/0028133 A1* | 2/2018 | Jones | G06T 11/008 |
| 2021/0407045 A1* | 12/2021 | Mironica | G06T 5/009 |
| 2022/0215557 A1* | 7/2022 | Xu | G06T 7/168 |

* cited by examiner

*Primary Examiner* — Xiaolan Xu  
(74) *Attorney, Agent, or Firm* — Lorenz & Kopf LLP

(57) ABSTRACT

Systems and methods for monitoring chain health of a chain having multiple links in a closed loop, as the chain cycles. The system includes: a camera statically positioned with respect to the chain, the camera configured to generate a frame to include a link from among the multiple links; and a controller module operationally coupled to the camera and programmed to repeat the steps of: receiving the frame; converting the frame to a black and white frame with a high-contrast; identifying a link type of the link in the black and white frame based on referencing a plurality of pre-defined skyline templates; and, storing the link with the link type and a respective temporal marker in a cache, storing a sequence. The system continues until discovering that the chain has cycled back to the starting link, identifies a type of chain for the chain, and fingerprints the chain.

20 Claims, 8 Drawing Sheets

SYSTEMS AND METHODS FOR MONITORING CHAIN HEALTH

TECHNICAL FIELD

The present disclosure generally relates to chains used in manufacturing of heavy equipment, and specifically relates to systems and methods for monitoring conveyer chain health.

As used herein, a chain is inclusive of a conveyer chain, and comprises multiple links assembled into a closed loop. A conveyer chain is generally configured in a manufacturing environment to cycle on a support apparatus and is often used to move objects or equipment.

Chain health has a direct effect on manufacturing efficiency. As a result of regular wear and tear, and because of defects or damage, the chain can unexpectedly break or become inadequate/unstable for its intended use, technical problems can result in a disruption in a large-scale manufacturing environment. The duration of such a disruption can be a function of the amount of time that it takes to locate and fix the defects or damage. Conveyer chains can be more than a half mile long, so locating an identified defective link for human intervention is a time-critical situation.

Accordingly, improvements to systems and methods for monitoring chain health are desirable. The following disclosure provides a technological solution to these technical problems, in addition to addressing related issues. Furthermore, other desirable features and characteristics of the system and method will become apparent from the subsequent detailed description and the appended claims, taken in conjunction with the accompanying drawings and the preceding background.

SUMMARY

In an embodiment, a method for monitoring chain health of a chain having multiple links in a closed loop, as the chain cycles, is provided. The method includes: receiving a frame from a camera that is statically positioned with respect to the chain as it cycles, the camera configured to generate the frame to include a link from among the multiple links; converting the frame to a black and white frame with a high-contrast; identifying a link type of the link in the black and white frame based on referencing a plurality of predefined skyline templates; and storing the link with the link type and a respective temporal marker in a cache.

In an embodiment, further including: locating long-lines in the black and white frame; straightening the black and white frame when it is determined that the black and white frame needs to be straightened based on respective slopes of the long-lines; isolating a frame-skyline in the black and white frame; and wherein identifying the link type further includes comparing the frame-skyline to the plurality of predefined skyline templates.

In an embodiment, further including: for each predefined skyline template of the plurality of predefined skyline templates, determining a fit coefficient based on walking the predefined skyline template across the frame-skyline; determining a stretch coefficient based on stretching the predefined skyline template across the frame-skyline; wherein identifying the link type is further a function of the fit coefficient and the stretch coefficient; and storing the link further with the fit coefficient and the stretch coefficient in the cache.

In an embodiment, further including: determining that the link as defective when, based on the link type, the black and white frame indicates that the link is missing a component or has a surface area flaw; and generating an alert that the link is defective.

In an embodiment, further including: receiving user input defining a fault mode and fault mode conditions; determining that the fault mode conditions exist in the black and white frame; and generating an alert of the link and the fault mode.

In an embodiment, further including: receiving user input defining a fault mode and fault mode conditions; determining that the fault mode conditions exist in the black and white frame; and generating an alert of the link and the fault mode.

In an embodiment, further including: after storing the link, denoting the link as a starting link, and (a) receiving at least one next frame from the camera, the at least one next frame to include a next link from among the multiple links; (b) converting the at least one next frame to a next black and white frame with a high-contrast; (c) identifying a link type of the next link in the next black and white frame; and (d) storing the next link with the link type and respective temporal marker in a cache; (e) building a chain segment including a sequence of the link type of the next link and a link type of at least one previous link; and repeating (a)-(d) until discovering, based on a sequence in the chain segment, that the chain has cycled back to the starting link.

In an embodiment, further including: identifying a type of chain for the chain, as a function of the sequence.

In an embodiment, further including creating a fingerprint the chain, the fingerprint including all of the multiple links of the chain, in a unique temporal sequence.

In an embodiment, further including storing the fingerprint for the chain in the cache.

In an embodiment, further including recognizing that the chain is missing a removed link, as a function of the fingerprint of the chain, and generating a notification based thereon.

In an embodiment, further including recognizing that the chain has a defective link, as a function of the fingerprint of the chain, and generating a notification based thereon.

In an embodiment, a system for monitoring chain health of a chain having multiple links in a closed loop, as the chain cycles, is provided. The system includes: a camera that is statically positioned with respect to the chain as it cycles, the camera configured to generate a frame to include a link from among the multiple links; and a controller module operationally coupled to the camera and programmed to: receive the frame; convert the frame to a black and white frame with a high-contrast; identify a link type of the link in the black and white frame based on referencing a plurality of predefined skyline templates; and store the link with the link type and a respective temporal marker in a cache.

In an embodiment, the controller module is further programmed to: locate long-lines in the black and white frame; straighten the black and white frame when it is determined that the black and white frame needs to be straightened based on respective slopes of the long-lines; isolate a frame-skyline in the black and white frame; and further identify the link type by comparing the frame-skyline to the plurality of predefined skyline templates.

In an embodiment, the controller module is further programmed to: for each predefined skyline template of the plurality of predefined skyline templates, determine a fit coefficient based on walking the predefined skyline template across the frame-skyline; determine a stretch coefficient based on stretching the predefined skyline template across the frame-skyline; identify the link type further as a function of the fit coefficient and the stretch coefficient; and store the link further with the fit coefficient and the stretch coefficient in the cache.

In an embodiment, the controller module is further programmed to: determine that the link as defective when, based on the link type, the black and white frame indicates that the link is missing a component or has a surface area flaw; and generating an alert that the link is defective.

In an embodiment, the controller module is further programmed to: receive user input defining a fault mode and fault mode conditions; determine that the fault mode conditions exist based on the black and white frame; and generate an alert of the link and the fault mode.

In an embodiment, the controller module is further programmed to: receive user input defining a fault mode and fault mode conditions; determine that the fault mode conditions exist in the black and white frame; and generate an alert of the link and the fault mode.

In an embodiment, the controller module is further programmed to: after storing the link, denote the link as a starting link, (a) receive a next frame from the camera, the next frame to include a next link from among the multiple links; (b) convert the next frame to a next black and white frame with a high-contrast; (c) identify a link type of the next link in the next black and white frame; and (d) store the next link with the link type and respective temporal marker in a cache; (e) build a chain segment including a sequence of the link type of the next link and a link type of at least one previous link; and repeat (a)-(d) until discovering, based on a sequence in the chain segment, that the chain has cycled back to the starting link.

In an embodiment, the controller module is further programmed to: identify a type of chain for the chain, as a function of the sequence; and create a fingerprint the chain, the fingerprint including all of the multiple links of the chain, in a unique temporal sequence.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
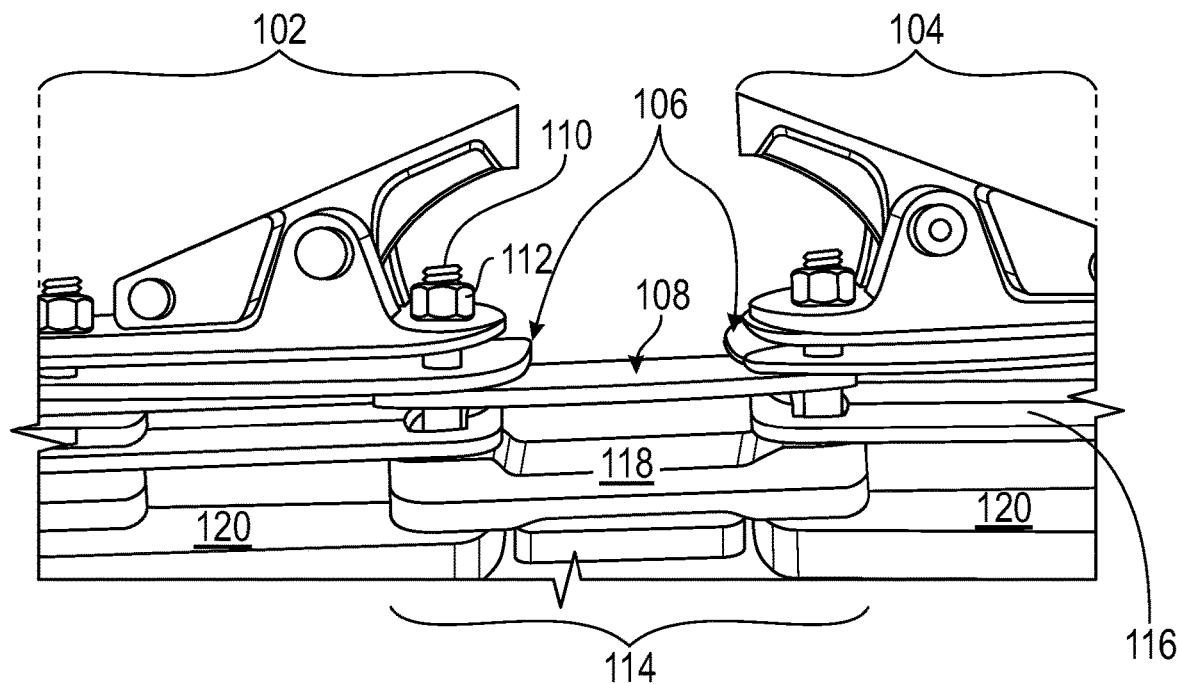
FIGS. 1-2 are diagrams providing examples of links in a chain, in accordance with various embodiments.

The following detailed description is merely exemplary in nature and is not intended to limit the application and uses. Furthermore, there is no intention to be bound by any expressed or implied theory presented in the preceding technical field, background, summary, or the following detailed description.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices.

As used herein, the term "module" may refer to any hardware, software, firmware, electronic control component, processing logic, and/or processor device, individually or in any combination, that provides the functionality attributed to the module. In various embodiments, a module includes one or more of: an application specific integrated circuit (ASIC), a field-programmable gate-array (FPGA), an electronic circuit, a computer system comprising a processor (shared, dedicated, or group) and memory that executes one or more software or firmware programs, a combinational logic circuit, and/or other suitable components that provide the functionality attributed to the module.

For the sake of brevity, conventional techniques related to signal processing, data transmission, signaling, control, machine learning models, radar, lidar, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

As mentioned, technical problems are presented in the use of conveyer chains. Regular wear and tear, defects, and damage, can cause the chain to unexpectedly break or become inadequate/unstable for its intended use, potentially disrupting a manufacturing environment. The duration of such a disruption can be a function of the amount of time that it takes to locate and fix the defects or damage. Moreover, as some conveyer chains are more than a half mile long, locating an identified defective link for human intervention is a time-critical situation.

As used herein, a link is an assembled link comprising one or more link components, assembled. As may be appreciated by a person with skill in the art, multiple links assembled into a closed loop form a chain. In various embodiments, the chain is a conveyer chain that is configured to cycle on an apparatus to move objects.

Exemplary embodiments provide a technological solution to these problems, in the form of a system for monitoring chain health of a chain having multiple links in a closed loop, as the chain cycles (hereinafter shortened to system 402, FIG. 4). As used herein, monitoring the chain health includes, identifying a link type for each link in the chain, identifying sequences of links in the chain, and identifying an entire sequence of links for a given chain, in addition to detecting damaged and defective link components, links, and segments of a chain. Provided embodiments monitor chain health at two levels: the individual links, and the overall chain, via a fingerprinting methodology described herein.

Advantageously, these embodiments can also detect configuration issues in a chain. Hence, embodiments can determine when a chain has not failed, per se, but was not constructed to follow a required pattern (e.g., a required pattern of A links of type 1 followed by B links of type 2, but the embodiments discover C links of type 1 and D links of type 2).

Figure 2:
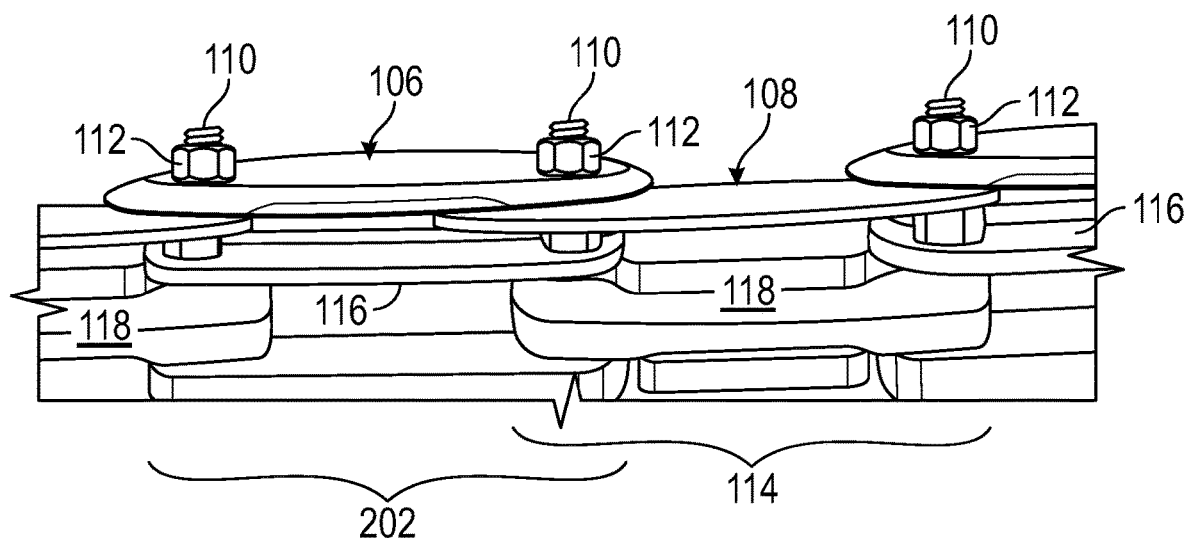
Figure 3:
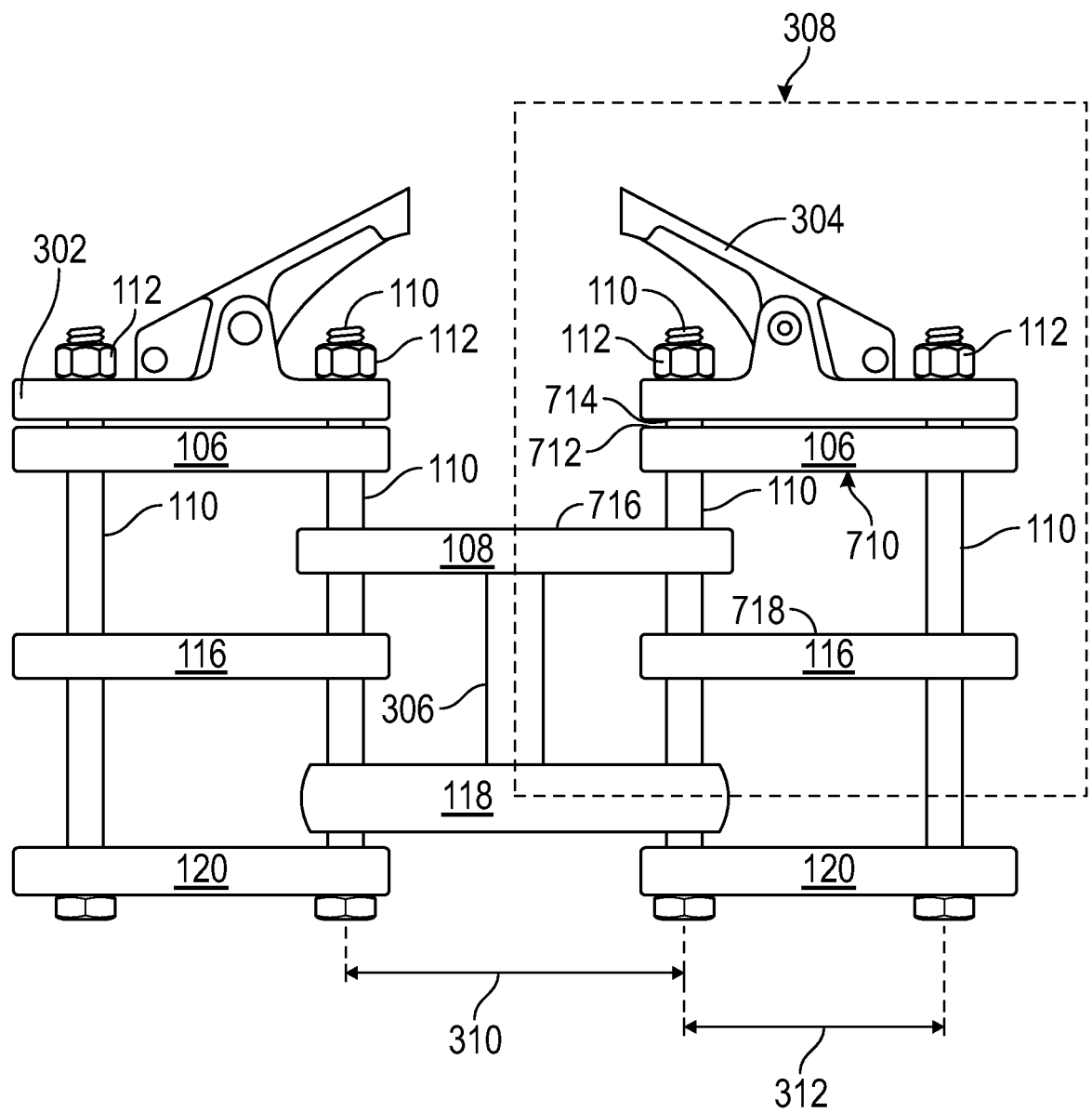
FIG. 3 is a simplified diagram of a link for use in labeling link components, in accordance with various embodiments.

For background and context, FIGS. 1-2 illustrate some non-limiting examples of links in a chain, in accordance with various embodiments, and FIG. 3 is provided to simplify and label components of a link for further reference. As may be appreciated, each chain may have its own respective sequence of links, by link type, and its own number of links. In the images of FIGS. 1-2, three exemplary link types are shown: brackets indicate the boundaries of a forward catch link 102, a spacer plate link 114, and a backward catch link 104.

As mentioned, each link comprises multiple components, including one or more link plates. Link plates take a variety of shapes, where form follows function, but for a given chain, the link plates generally have the same length (e.g., length 310 is equal to length 312). In various chains, links are four inches, measured from a center of a first bolt to a center of a second bolt. In other embodiments, the links are six inches. Non-limiting examples of link plates used herein include rider plates 106, top plates 116, spacer plates 108, one or more of link plate 118 and one or more of link plate 120. The bolts 110 extend through the various link plates, pivotally connecting them to each other. The nuts 112 secure the components of the link in place. In some embodiments, the spacer plate 108 is integrated with link plate 118, as shown with connecting segment 306. In some embodiments, a bolt 110 is just an extension from a dog-bone hinge that connects two links together; therefore, in some configurations of the chain, such as those that do not have the rider plate, a dog-bone hinge serves the functionality of the bolt 110.

In the images of FIGS. 1-2, the forward catch link 102 includes a forward catch dog 302 bolted to a rider plate 106 (via bolt 110 and nut 112). The backward catch link 104 includes a backward catch dog 304 bolted to a rider plate 106. Each rider plate 106 is separated from top plates 116 by a spacer plate 108.

As may be appreciated, the exemplary chain represented by these links is a non-limiting example. There are other configurations of the chain such as those using those catch dogs; and chains that use pusher blocks for the chain to slide things along. Also, sometimes the links are supported by wheels from above in a trolley or below looking like a little electric train.

Dashed lines indicate a frame 308, provided by a camera, as further described in connection with FIG. 4. As shown in FIG. 4, embodiments of the system 402 include a camera 406 that is statically positioned with respect to the chain 401 as it cycles, a controller module 404, and one or more external sources 420.

The camera 406 is configured to capture a continuous video feed, and to break the video feed into frames. The camera 406 thereby generates the frame 308 to include a link (e.g., link 410, link 412, link 414, and link 416) from among the multiple links comprising the chain 401. In various embodiments, the camera 406 is situated in a camera system 408 and is configured to capture frames of the chain 401 (responsive to a configurable timing control), convert sensed information into a frame of frame data, and transmit the frame to a controller module 404, as indicated by connection 418, which may be wired or wireless. In various systems 402, the camera 406 may be an optical camera, an infra-red camera, or other sensing camera. In various embodiments, the camera 406 receives timing configurations and other commands (wired or wirelessly) from the controller module 404. In other embodiments, the camera system 408 is also wired or wirelessly connected to external sources 420 and may receive the aforementioned timing configurations and other commands from either the controller module 404 or one or more external sources 420.

External sources 420 may include a user interface 422, or a central command 424 (e.g., a fleet control). External sources 420 may include the internet. The user interface 422 may be part of an overall human-machine interface, HMI, and may generally include a display device and a user input device (UI). In various embodiments, the user input device can be any combination of a keyboard, cursor control device, voice input device, gesture input apparatus, or the like.

Various embodiments of the system 402 may include one or more other components and/or systems that communicate with each other, generally via the external sources 420.

Figure 4:
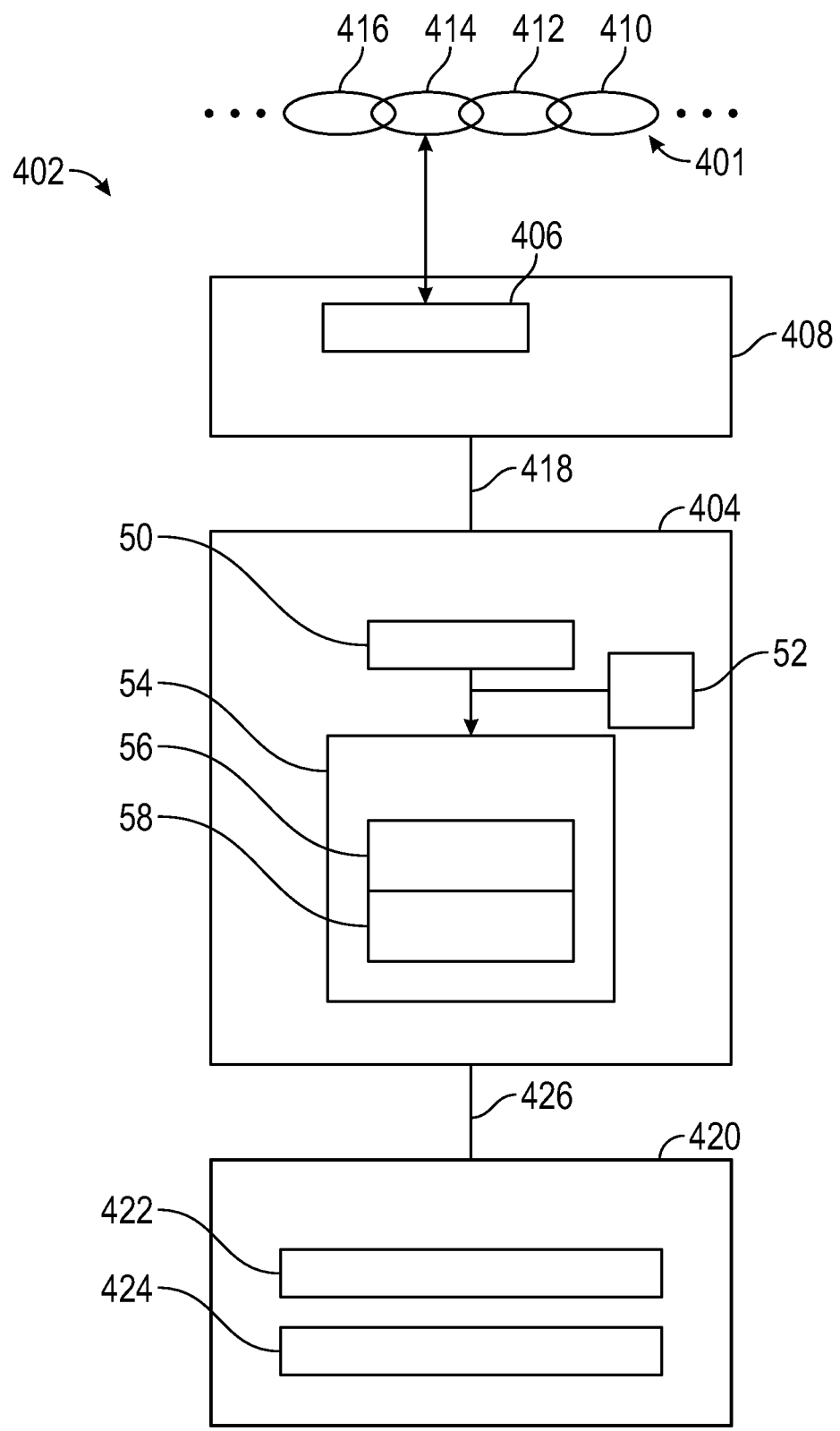
FIG. 4 is a schematic diagram of a system for monitoring chain health of a chain having multiple links in a closed loop, as the chain cycles, in accordance with various embodiments.

In FIG. 4, the central management of tasks/operations is provided by the controller module 404. In other embodiments, the central management of tasks/operations may be generated by a controller circuit, PLA, custom circuit, or the like. In various embodiments, the controller module 404 is communicatively coupled to the camera system 408, and in particular, the camera 406, via the connection 418, and to the external sources 420, via bus 426. In various embodiments, the controller module 404 is configured to transmit commands, controls, and power for various components of the system 402.

In various embodiments, as shown in FIG. 4, the controller module 404 is realized as an enhanced computer system, comprising computer readable storage device or media, memory 54, for storage of instructions, algorithms, and/or programs 56, and operating parameters 58, such as, preprogrammed model and configuration requirements. The controller module 404 also includes a processor 50 to execute the program 56, and an input/output interface (I/O) 52. The computer readable storage device or media, memory 54, may include volatile and nonvolatile storage in read-only memory (ROM), random-access memory (RAM), and keep-alive memory (KAM), for example. KAM is a persistent or non-volatile memory that may be used to store various operating variables while the processor 50 is powered down. The memory 54 may be implemented using any of several known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the processor 50 in controlling the vehicle. In various embodiments, processor 50 is configured to implement the system 402. The memory 54 may also be utilized by the processor 50 to cache data, to temporarily store results of comparisons and analyses, and the like. Information in the memory 54 may be organized and/or imported from an external source during an initialization or installment operation in a method; it may also be programmed via a user I/O interface.

In various embodiments, a plurality of predefined skyline templates is stored in parameters 58. Each predefined skyline template is unique to a respective link type, having an ideal geometry for the link type, including a silhouette, length, and a surface area smoothness requirement. As is described in more detail below, the plurality of predefined skyline templates is used by the controller module 404 for comparison to links in the frame, to identify a link type, make determinations about link integrity and health, and to make a determination about overall chain health.

The input/output interface (I/O) 52 may be operationally coupled to the processor 50 via a bus and enables intra-module 404 communication as well as extra-module 404 communication. The input/output interface (I/O) 52 may include one or more wired and/or wireless network interfaces and can be implemented using any suitable method and apparatus. In various embodiments, the input/output interface (I/O) 52 includes the hardware and software to support one or more communication protocols for wireless communication between the processor 50 and external sources, such as satellites, the cloud, communication towers and ground stations. In various embodiments, the input/output interface (I/O) 52 supports communication with technicians, and/or one or more storage interfaces for direct connection to storage apparatuses.

During operation of the system 402, the processor 50 loads and executes one or more algorithms, instructions, and rules embodied as program 56, and, as such, controls the general operation of the system 402. During operation of the system 402, the processor 50 may receive data from the connection 418 or external sources 420, via bus 426. In various embodiments of the system 402, the controller module 404 may: perform operations attributed to the system 402 in accordance with an algorithm; perform operations in accordance with state machine logic; and perform operations in accordance with logic in a programmable logic array.

While the exemplary embodiment of the system 402 is described in the context of the controller module 404 implemented as a fully functioning enhanced computer system, those skilled in the art will recognize that the mechanisms of the present disclosure are capable of being distributed as a program product including program 56 and predefined parameters. Such a program product may comprise an arrangement of instructions organized as multiple interdependent program code modules, each configured to achieve a separate process and/or perform a separate algorithmic operation, arranged to manage data flow through the system 402. The program code modules may each comprise an ordered listing of executable instructions for implementing logical functions for the processes performed by the system 402. The instructions in the program code modules, when executed by a processor (e.g., processor 50), cause the processor to receive and process signals, and perform logic, calculations, methods and/or algorithms as described herein.

Once developed, the program code modules constituting a program product may be stored and distributed individually, or together, using one or more types of non-transitory computer-readable signal bearing media may be used to store and distribute the instructions, such as a non-transitory computer readable medium. Such a program product may take a variety of forms, and the present disclosure applies equally regardless of the type of computer-readable signal bearing media used to carry out the distribution. Examples of signal bearing media include recordable media such as floppy disks, hard drives, memory cards and optical disks, and transmission media such as digital and analog communication links. It will be appreciated that cloud-based storage and/or other techniques may also be utilized as memory and as program product time-based viewing of clearance requests in certain embodiments.

Figure 5:
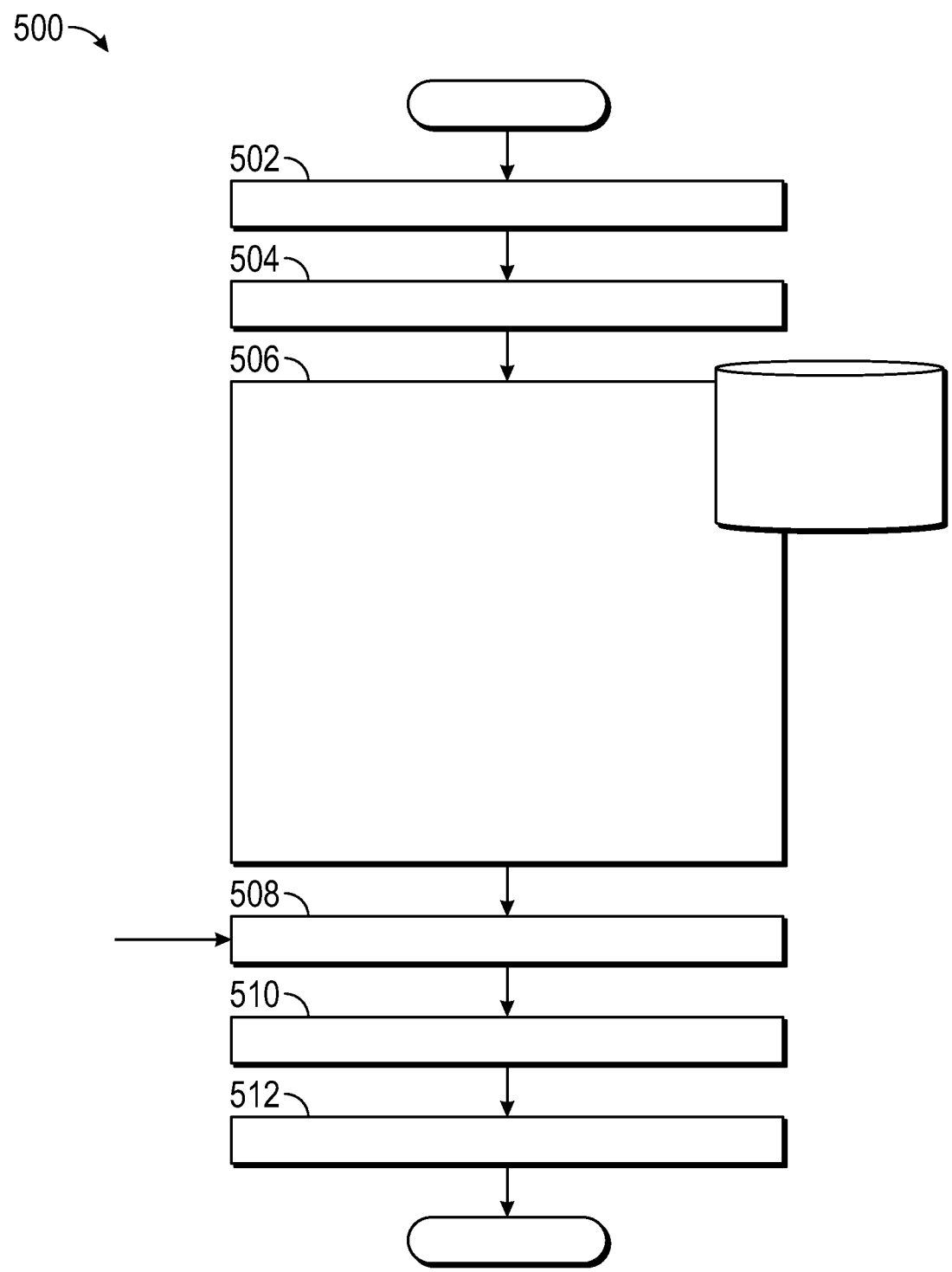
FIGS. 5-6 are a process flow chart depicting an example method for monitoring chain health of a chain having multiple links in a closed loop, as the chain cycles, in accordance with various embodiments.
Figure 6:
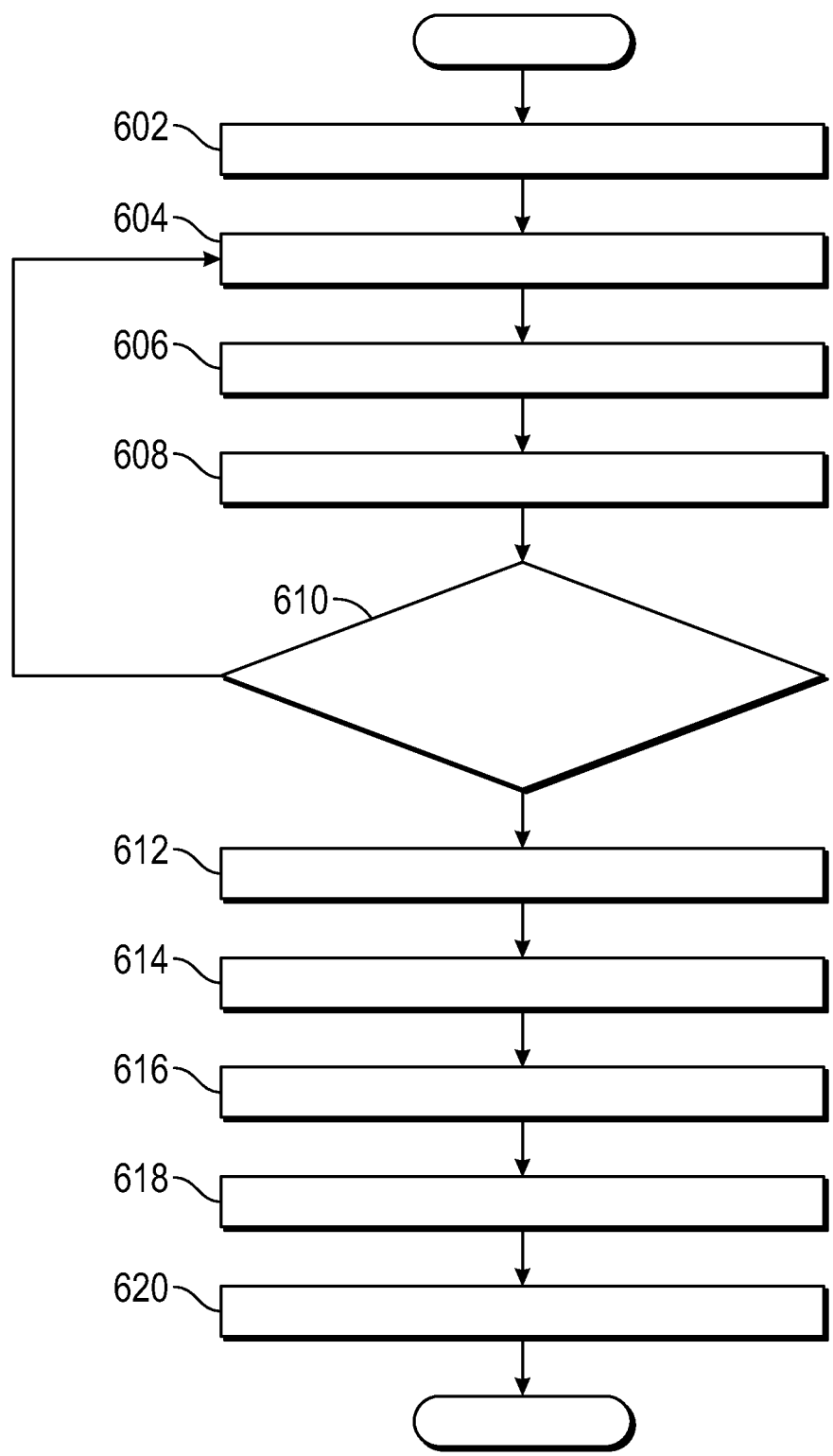
Figure 7:
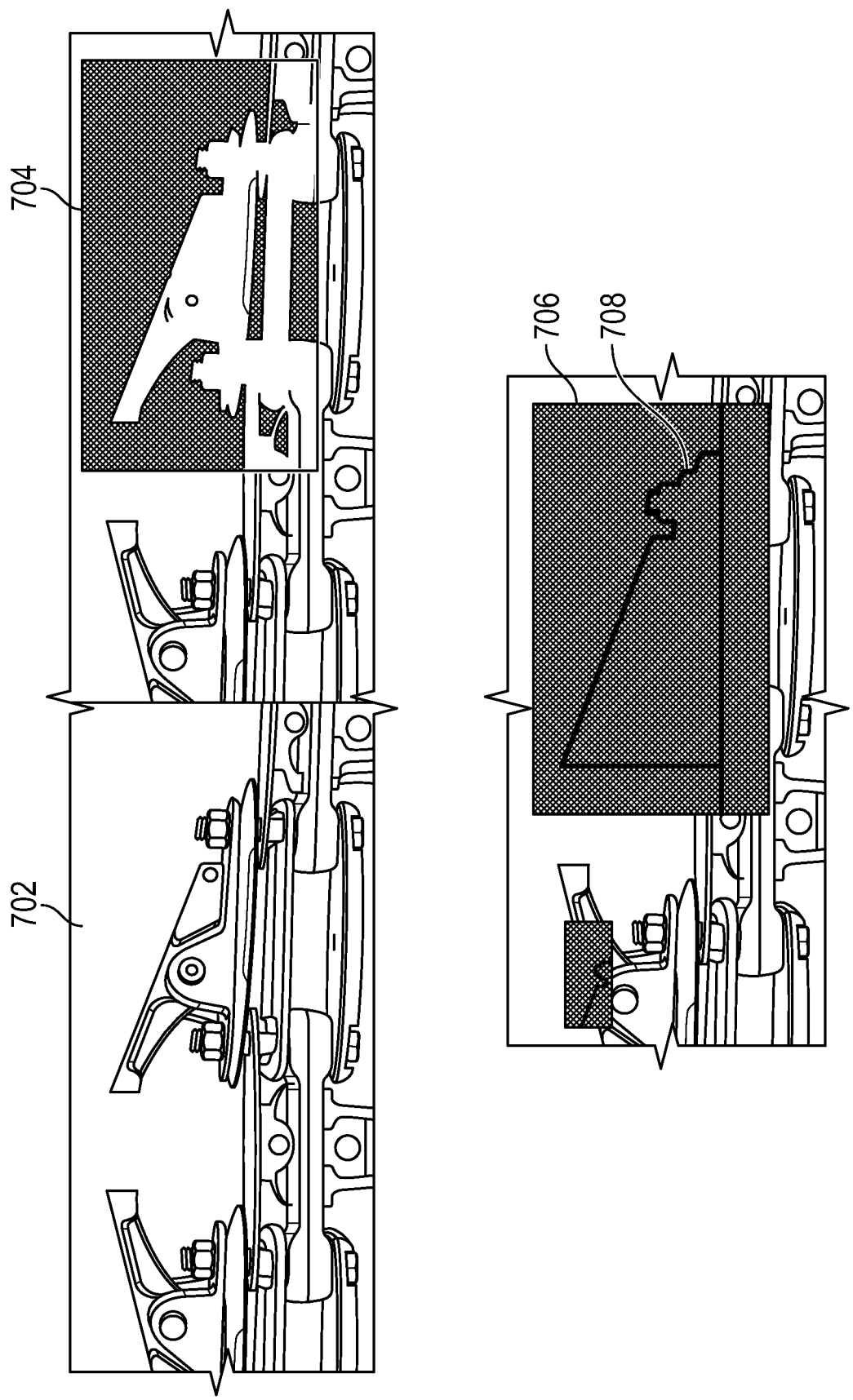
FIG. 7 is an illustration depicting some of the steps in the method of FIGS. 5-6.
Figure 8:
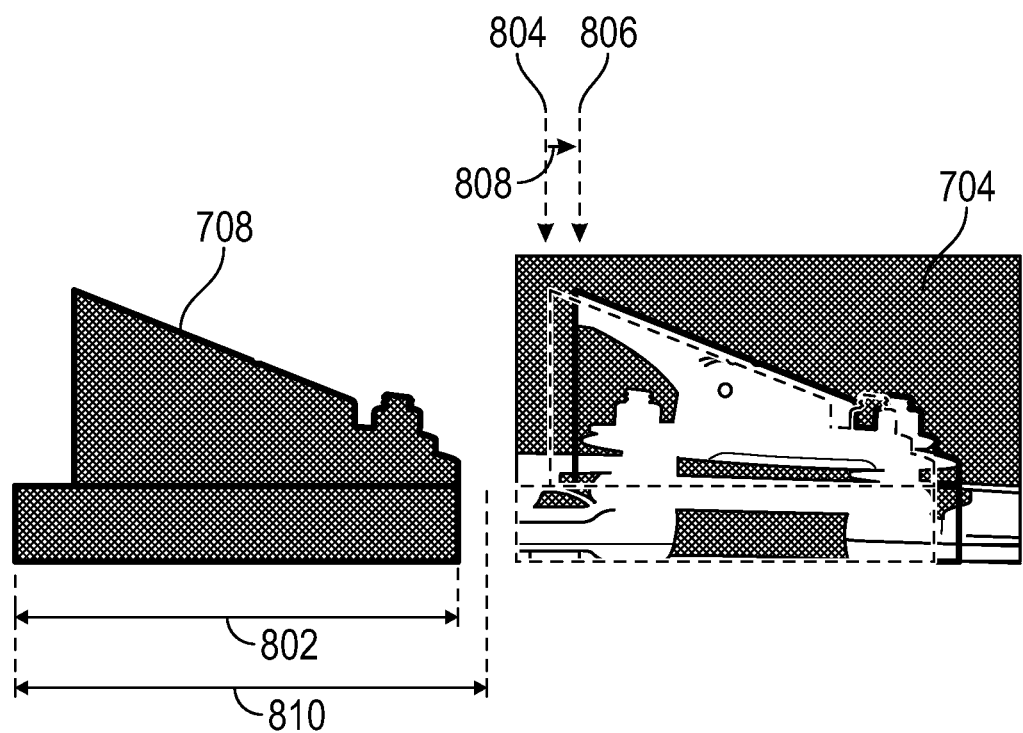
FIGS. 8 and 9 are illustrations depicting walking a skyline template and determining a stretch coefficient and fit coefficient, in accordance with various embodiments.

Turning now to FIGS. 5-6, and with continued reference to FIGS. 1-4, various method steps for monitoring chain health of a chain having multiple links in a closed loop are described, shown generally as method 500. FIGS. 7-8 are referenced to illustrate steps in the method 500.

For illustrative purposes, the following description of method 500 may refer to elements mentioned above in connection with FIGS. 1-4. It should be appreciated that method 500 may include any number of additional or alternative operations and tasks, the tasks shown in FIGS. 5-6 need not be performed in the illustrated order, and method 500 may be incorporated into a more comprehensive procedure or method, such as an energy saving or safety application, having additional functionality not described in detail herein. Moreover, one or more of the tasks shown in FIGS. 5-6 could be omitted from an embodiment of the method 500 if the intended overall functionality remains intact.

At 502, the method begins with receiving a frame 308 (e.g., FIG. 7, 702) from a camera 406 that is statically positioned with respect to the chain 401 as it cycles, the camera 406 is configured to generate the frame 702 to include a link from among the multiple links. In some embodiments, to ensure contrast to generate the frame-skyline, a white board is placed in the background of the chain. At 504 the method converts the frame to a black and white frame with high-contrast (e.g., FIG. 7, 704). In an embodiment, contrast enhancement is performed by scanning the frame from left to right and top to bottom, looking for edges between black and white and enhancing them. As used herein, high-contrast is a conventional photography term that means a limited color palate, here, black and white, with bright whites and dark shadows, and a contrast greater than a threshold contrast.

At 506, the method identifies the link type of the link in the black and white frame based on referencing the plurality of predefined skyline templates. For example, black and white frame 706 has indicated skyline template 708, which was determined to be a best match or fit for the black and white image. In various embodiments, the task 506 includes one or more tasks. Some embodiments include identifying the individual components of the link at step 506. Some embodiments include locating individual component and features, to identify a link. Upon determining that the correct components are present for a link type, the link type can be identified.

Some embodiments perform a rotation correction (also referred to as straightening) at 506. For a rotation correction, the method 500 locates long-lines in the black and white frame. Long-lines being defined as horizontal lines that are substantially straight and extend substantially across the frame, or a line longer than a threshold length. With reference to FIG. 3, long-lines may include one or more of lines 710, 712, 714, 716, and 718, for example. The slope of the long-lines may then be compared to a slope threshold (e.g., plus or minus 2% from a flat horizon) to determine whether they are as horizontally planar as required for the link to be considered straight and not twisted. When it is determined that the black and white frame needs to be straightened based on respective slopes of the long-lines, the method may move to correcting this by rotating or straightening the black and white frame based on the determined slopes.

Once any straightening that is required is performed, the method 500 may move to a step of isolating a frame-skyline in the black and white frame. Isolating a frame-skyline may include representing the outline with a single vector. Identifying the link type may further include comparing the frame-skyline to the plurality of predefined skyline templates. Exemplary skyline template 708 is shown in FIG. 7.

Figure 9:
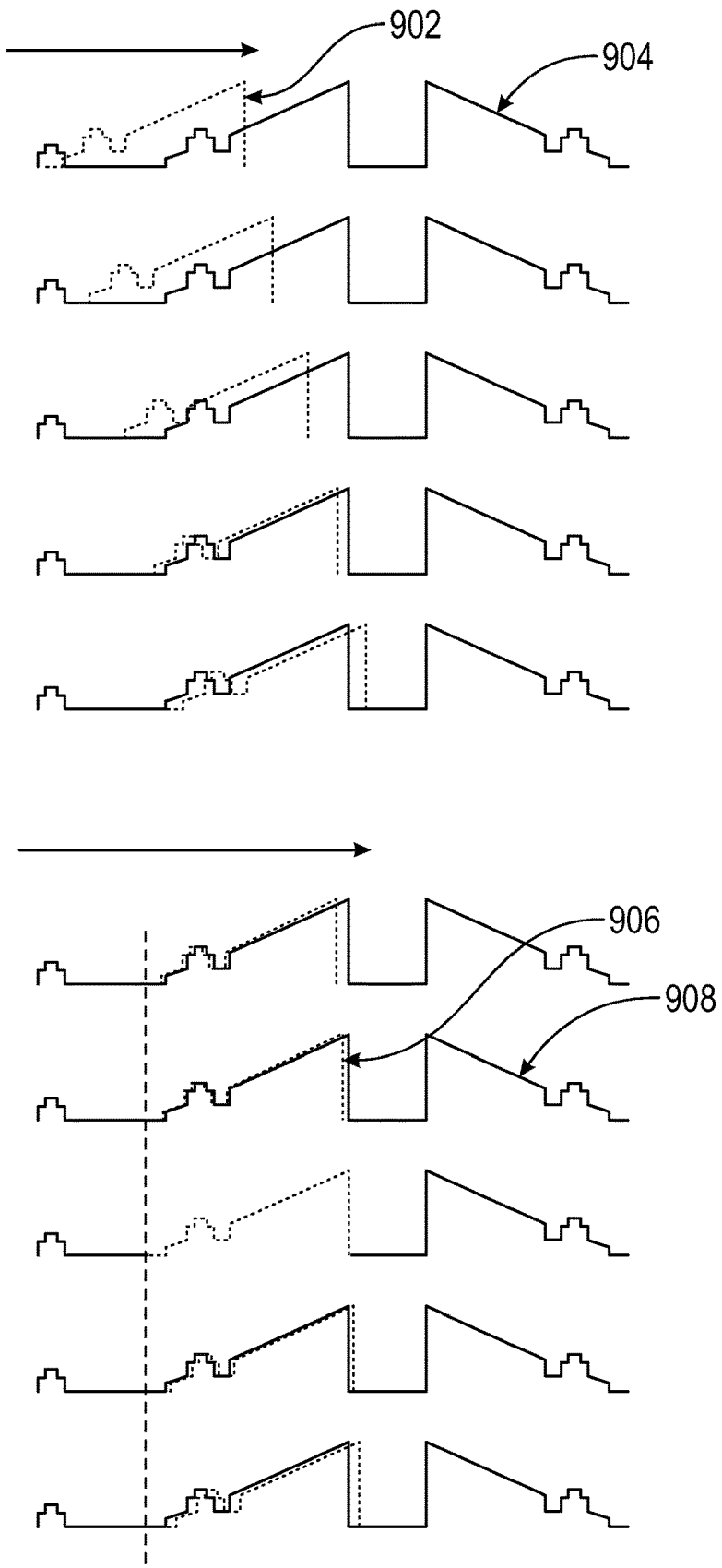

Another aspect of identifying link type at 506 may include determining fit and stretch (see, FIG. 8 and FIG. 9). In an embodiment, at 506, the method 500 may determine the fit coefficient for each of N templates to identify the link configuration. For example, for each predefined skyline template of the plurality of predefined skyline templates, the system 402 may determine a fit coefficient based on walking the skyline template 708 across the frame-skyline and detecting overrun/underrun space or gaps. This is illustrated in FIG. 8, showing skyline template 708 having link length 802; The skyline template 708 is initially positioned at 804, and incrementally walked from left to right to a next position 806, this walking continues, in increments of 808. The increments are configurable and may be stored with the other parameters 58. As the error or margin between the skyline template and the frame-skyline go to zero (a perfect fit), the fit coefficient goes to one. A configurable fit threshold can be used to compare the fit coefficient to, and when the fit coefficient is greater than the fit threshold, the skyline template is determined to match the frame-skyline. In embodiments, this fit coefficient is used to identify the link template. In FIG. 9, the image at the top of the page shows walking of a skyline template 902 (a dotted line) from left to right across frame-skyline 904, as illustrated from top to bottom in the image.

The stretch coefficient can similarly be determined. Once the link type has been determined, by incrementally stretching the skyline template across the frame-skyline; e.g., stretching skyline template 708 to have length 810, and walking it across the frame-skyline while detecting overrun/underrun space or gaps. The more the skyline template has to be stretched to match the frame-skyline (larger stretch), the lower the stretch coefficient. The stretch coefficient can be compared to a configurable stretch threshold, and when the stretch coefficient is less than the stretch threshold, the frame-skyline is determined to be stretched to a defective degree. In some embodiments, identifying the link type can further include selecting a skyline template best matches the link in the frame as a function of the fit coefficient and the stretch coefficient. In FIG. 9, the bottom image shows a skyline template 906 (dotted line) being stretched from left to right (each starting with the same walking start on the left) across frame-skyline 908, in a series of sequential images from the top to the bottom.

In some embodiments, the fit coefficient and the stretch coefficient are determined concurrently by the system. For example, using a skyline template of a first length (e.g., 100), slide (walk) this skyline template across the frame in incremental steps, and record, each step, any errors (differences between the frame-skyline in the frame and the skyline template) of the walk across the frame. Then stretch the template (incrementally increase its length) to be of length 101, then walk the skyline template across the frame-skyline in the frame again and record the errors. Upon completing, repeat again, to go through all length values for a predefined range (e.g. 100-120) associated with the respective skyline template. Upon completing these multiple walks, the system reviews all the collected error values and determines a combination of a ('walking' position and stretched length that yielded the lowest error. The combined walk and stretch may be described in a programming loop, as below:

```
Loop WALKING_START from MIN_WALK_START to
MAX_WALK_START
    Loop STRETCH_FACTOR from MIN_STRETCH_FACTOR to
MAX_STRETCH_FACTOR
        Compare template to frame-skyline from WALKING_START with
STRETCH_FACTOR
    End Loop
End Loop
Use the best WALKING_START and STRETCH_FACTOR
```

At 508, in various embodiments, the method determines whether the link is defective using the black and white frame 704. In some embodiments, the determination made at 508 is based on a predefined link length (e.g., so that a stretch defect can be ascertained as the defect). In some embodiments, the determination at 508 is based on a predefined surface area smoothness (e.g., so that a crack or distortion can be ascertained as the defect). In some embodiments, the determination made at 508 is based on noticing that a component of the link is missing, defective, or damaged (e.g., a broken bolt). Missing links are addressed in more detail below. In some embodiments, in addition to predefined parameters, a user fault mode is received via the user interface 422, and the determination at 508 is further made based upon the criterion provided by the user fault mode. At 510, in various embodiments, when a defect is determined, an alert is generated, the alert may be an email notification, text notification, or a graphical user interface object or light that lights up on a display. In various embodiments, the email notification includes the frame from the video feed of the camera 406.

At 512, the method proceeds to storing the link with its link type and a respective temporal marker in a cache. In embodiments that have made other determinations about the link, such as a fit coefficient, a stretch coefficient, whether there is a defect, if there is a defect, which fault mode it is attributed to, etc., those determinations may also be stored with the link, the link type, and the temporal marker. All of this data stored with the link may be referred to as metadata for the link. The fingerprint for the chain, described herein, is created from the metadata about each link in a chain, specifically the link type and the stretch coefficient of the links in the chain.

Steps 502-512 can be relied upon to identify a link type and detect the health of each link in a chain, and to generate notifications and alerts based on determinations. Moving now to the steps 602-620, which may optionally branch from step 512, the method 500 can provide additional information as to the chain in its entirety, At 602, the method may mark the link as a starting link and proceed to processing additional links. In some embodiments, multiple frames correspond with one link, therefore the method moves to finding a new link next. At 604, at least one next frame (e.g., at least one incremented frame) is received, and at 606, the method 500 may perform steps 504-510 on the at least one next frame to thereby identify the link in the at least one next frame. The incremented frame is stored with the previous frame, and these sequential frames are the beginning of a chain sequence at 608.

As may be appreciated, as the chain continues to cycle, it will eventually return to the starting link, and the current links begin to match with historically saved links in a sequence; this can be referred to as folding over, or fingerprint overlap, in the cache, resulting in a fingerprint for the chain.

The method uses the fingerprint to determine whether it has "cycled to the starting link" in 610. In fact, the method essentially folds the link samples over themselves to determine whether it has found the starting link again. To do this, the method compares a first N links to a second N links, then a first N+2 links to a second N+2 links, and so on, in a loop. Then the method uses a lowest Average_Error calculated by these loops to determine that the best N represents an actual number of links in the chain. An example loop provides:

```
Loop N=SMALLEST_LEN to LARGEST_LEN by 2
    Cumulative_Error = 0
    Loop i=1 to N
    Cumulative_Error=Cumulative_Error+abs(link_stretches[i] –
    link_stretches[i+N])
    End Loop
    Average_Error = Cumulative_Error / N
End Loop
```

Accordingly, at 610, if the method 500 determines that the incremented frame does not include the starting link, it returns to 604, cycling until it determines that it is back on the starting link.

At 612, based at least on the sequence of links, the chain type can be identified and stored with the chain link information. In some embodiments, a sequence of as few as six links may be used to identify the chain and the starting link. At 614, the chain may be fingerprinted which means collating the unique links/link types in their sequence for this particular chain, including, potentially, the stretch coefficients and fit coefficients.

Not only does the sequence of links form a unique fingerprint in a chain, but in various embodiments, the method uses an average stretch for different chain segments to form a unique fingerprint. So, for example if the chain pattern repeats itself every 50 links (e.g., FW catch, spacer, FW catch, spacer, BW catch, spacer and then 22 pairs of top-plate/spacers), embodiments additionally compute an average stretch of recurring segments of repeating length and additionally store this with fingerprint information for the chain. Embodiments define this as a chain segment fingerprint for the chain, to distinguish from the above-described chain link fingerprint.

The chain fingerprint can be stored at 618, and this provides a useful historical reference as the chain continues to cycle, because now the method 500 and system 402 can locate a link in the chain and can compare each link as it is currently sensed, with its previous data. Based on the comparison to the previous data, the method 500 and system 402 can recognize that a link has been removed at 618 and can identify a link that has stretched or become defective at 620. Further, based on the fingerprinting, the method 500 and system 402 can predict an amount of time between a current place in the cycling of the chain and when a specific link will be back in the video feed, i.e., back in front of the camera. This prediction capability vastly improves worker efficiency in finding and repairing defective links over available solutions.

As mentioned, the method 500 and system 402 can recognize that a link has been removed at 618. Once the system has identified the chain, it can recognize when a link has been missed by the camera, and further recognize specifically which link was missed. This is done in three ways, #1—when there are adjacent links that cannot physically be adjacent such as, a top-plate followed by another top-plate instead of a spacer link, #2—when the pattern (of the chain) is found to be of the wrong length, i.e., 48 links between the repeating of the pattern instead of 50; or #3—by inserting a "wildcard" link in a sample sequence of the chain that effectively shifts the sequencing of the sample after it, thus repairing the fingerprint match.

Inserting the wildcard link means inserting a wildcard link that is ignored in calculating the average error. The wildcard link is initially inserted into a first suspected position of a missing link, and then into a second suspected position and into a third suspected position, and so on. After each insertion, an overall fit of the fingerprint is compared to a target for the chain, and a fingerprint-comparison-error is calculated. The system 402 detects that a wildcard link was inserted into a correct location when there is a sudden drop in a fingerprint-comparison-error; i.e., this drop in fingerprint-comparison-error indicates that the correct missing link location has been found/recognized. Stated more concisely, the system 402 continues cycling the chain after discovering the starting link; cycles a wildcard link through multiple suspected positions of a missing link; calculates a fingerprint-comparison-error at each suspected position of the multiple suspected positions; compares each a fingerprint-comparison-error to each other; and detect a correct location for the missing link when the fingerprint-comparison-error is more than a threshold less than remaining fingerprint-comparison-errors.

This concept can be expanded further, for example, there may be more than one missing link. The wildcard links may number more than 1 indicating that a sequence of links was missed. Further still, it is possible that N non-consecutive links were missed, in which case, the system can walk more than one collection of wildcard links through the samples, thus repairing a fingerprint with more than one missed sequence of links but still being able to identify the location of the sampled links against a historical fingerprint.

Additionally, as one with skill in the art may appreciate, relying on frame-skyline recognition as these embodiments provide, delivers a flexible health monitoring approach because, in practice, the chain is likely to be cycled at different speeds, and to start and stop abruptly, etc. Therefore, available chain health monitoring systems that are only calibrated by time are very handicapped and cumbersome to work with in a large-scale manufacturing setting.

Thus, the provided systems and methods for monitoring chain health of a chain having multiple links in a closed loop, as the chain cycles, have been described.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. Various changes can be made in the function and arrangement of elements without departing from the scope of the disclosure as set forth in the appended claims and the legal equivalents thereof.

What is claimed is:

1. A method for monitoring chain health of a chain having multiple links in a closed loop, as the chain cycles, comprising:
   receiving a frame from a camera that is statically positioned with respect to the chain as it cycles, the camera configured to generate the frame to include a link from among the multiple links;

converting the frame to a black and white frame with a high-contrast, high-contrast being a contrast greater than a threshold contrast;
locating long-lines in the black and white frame, long-lines being longer than a threshold length;
straightening the black and white frame when it is determined that the black and white frame needs to be straightened based on respective slopes of the long-lines;
isolating a frame-skyline in the black and white frame;
identifying a link type of the link in the black and white frame based on referencing a plurality of predefined skyline templates, wherein identifying the link type further includes comparing the frame-skyline to the plurality of predefined skyline templates;
for each predefined skyline template of the plurality of predefined skyline templates,
    determining a fit coefficient based on walking the predefined skyline template across the frame-skyline; and
    determining a stretch coefficient based on stretching the predefined skyline template across the frame-skyline;
    wherein identifying the link type is further a function of the fit coefficient and the stretch coefficient; and
storing the link with the link type and a respective temporal marker in a cache and further with the fit coefficient and the stretch coefficient in the cache.

2. The method of claim 1, further comprising:
determining that the link as defective when, based on the link type, the black and white frame indicates that the link is missing a component or has a surface area flaw; and
generating an email notification that the link is defective.

3. The method of claim 2, further comprising:
receiving user input defining a fault mode and fault mode conditions;
determining that the fault mode conditions exist in the black and white frame; and
generating an email notification of the link and the fault mode.

4. The method of claim 1, further comprising:
receiving user input defining a fault mode and fault mode conditions;
determining that the fault mode conditions exist in the black and white frame; and
generating an email notification of the link and the fault mode.

5. The method of claim 1, further comprising:
after storing the link, denoting the link as a starting link, and
(a) receiving at least one next frame from the camera, the at least one next frame to include a next link from among the multiple links;
(b) converting the at least one next frame to a next black and white frame with a high-contrast;
(c) identifying a link type of the next link in the next black and white frame; and
(d) storing the next link with the link type and respective temporal marker in a cache;
(e) building a chain segment comprising a sequence of the link type of the next link and a link type of at least one previous link; and
repeating (a)-(d) until discovering, based on a sequence in the chain segment, that the chain has cycled back to the starting link.

6. The method of claim 5, further comprising:
identifying a type of chain for the chain, as a function of the sequence.

7. The method of claim 5, further comprising creating a fingerprint the chain, the fingerprint comprising all of the multiple links of the chain, in a unique temporal sequence.

8. The method of claim 7, further comprising storing the fingerprint for the chain in the cache.

9. The method of claim 7, further comprising:
recognizing that the chain is missing a removed link, as a function of the fingerprint of the chain, and generating a notification based thereon.

10. The method of claim 7, further comprising:
recognizing that the chain has a defective link, as a function of the fingerprint of the chain, and generating a notification based thereon.

11. A system for monitoring chain health of a chain having multiple links in a closed loop, as the chain cycles, comprising:
a camera that is statically positioned with respect to the chain as it cycles, the camera configured to generate a frame to include a link from among the multiple links; and
a controller module operationally coupled to the camera and programmed to:
    receive the frame;
    convert the frame to a black and white frame with a high-contrast, high-contrast being a contrast greater than a threshold contrast;
    locate long-lines in the black and white frame, long-lines being longer than a threshold length;
    straighten the black and white frame when it is determined that the black and white frame needs to be straightened based on respective slopes of the long-lines;
    isolate a frame-skyline in the black and white frame;
    identify a link type of the link in the black and white frame based on referencing a plurality of predefined skyline templates and further by comparing the frame-skyline to the plurality of predefined skyline templates;
    for each predefined skyline template of the plurality of predefined skyline templates,
        determine a fit coefficient based on walking the predefined skyline template across the frame-skyline;
        determine a stretch coefficient based on stretching the predefined skyline template across the frame-skyline; and
        identify the link type further as a function of the fit coefficient and the stretch coefficient; and
    store the link with the link type and a respective temporal marker in a cache and further with the fit coefficient and the stretch coefficient in the cache.

12. The system of claim 11, wherein the controller module is further programmed to:
determine that the link as defective when, based on the link type, the black and white frame indicates that the link is missing a component or has a surface area flaw; and
generating an email notification that the link is defective.

13. The system of claim 12, wherein the controller module is further programmed to:
receive user input defining a fault mode and fault mode conditions;
determine that the fault mode conditions exist based on the black and white frame; and generate an email notification of the link and the fault mode.

14. The system of claim 11, wherein the controller module is further programmed to:
receive user input defining a fault mode and fault mode conditions;
determine that the fault mode conditions exist in the black and white frame; and
generate an email notification of the link and the fault mode.

15. The system of claim 11, wherein the controller module is further programmed to:
after storing the link, denote the link as a starting link,
(a) receive a next frame from the camera, the next frame to include a next link from among the multiple links;
(b) convert the next frame to a next black and white frame with a high-contrast;
(c) identify a link type of the next link in the next black and white frame; and
(d) store the next link with the link type and respective temporal marker in a cache;
(e) build a chain segment comprising a sequence of the link type of the next link and a link type of at least one previous link;
repeat (a)-(d) until discovering, based on a sequence in the chain segment, that the chain has cycled back to the starting link;
continue cycling the chain after discovering the starting link;
cycle a wildcard link through multiple suspected positions of a missing link;
calculate a fingerprint-comparison-error at each suspected position of the multiple suspected positions;
compare each a fingerprint-comparison-error to each other; and
detect a correct location for the missing link when the fingerprint-comparison-error is more than a threshold less than remaining fingerprint-comparison-errors.

16. The system of claim 15, wherein the controller module is further programmed to:
identify a type of chain for the chain, as a function of the sequence; and
create a fingerprint the chain, the fingerprint comprising all of the multiple links of the chain, in a unique temporal sequence.

17. A system for monitoring chain health of a chain having multiple links in a closed loop, as the chain cycles, comprising:
a camera that is statically positioned with respect to the chain as it cycles, the camera configured to generate a frame to include a link from among the multiple links; and
a controller module operationally coupled to the camera and programmed to:
receive the frame;
convert the frame to a black and white frame with a high-contrast, high-contrast being a contrast greater than a threshold contrast;
identify a link type of the link in the black and white frame based on referencing a plurality of predefined skyline templates;
store the link with the link type and a respective temporal marker in a cache;
after storing the link, denote the link as a starting link,
(a) receive a next frame from the camera, the next frame to include a next link from among the multiple links;
(b) convert the next frame to a next black and white frame with a high-contrast;
(c) identify a link type of the next link in the next black and white frame; and
(d) store the next link with the link type and respective temporal marker in a cache;
(e) build a chain segment comprising a sequence of the link type of the next link and a link type of at least one previous link;
repeat (a)-(d) until discovering, based on a sequence in the chain segment, that the chain has cycled back to the starting link;
continue cycling the chain after discovering the starting link;
cycle a wildcard link through multiple suspected positions of a missing link;
calculate a fingerprint-comparison-error at each suspected position of the multiple suspected positions;
compare each a fingerprint-comparison-error to each other; and
detect a correct location for the missing link when the fingerprint-comparison-error is more than a threshold less than remaining fingerprint-comparison-errors.

18. The system of claim 17, wherein the controller module is further programmed to:
identify a type of chain for the chain, as a function of the sequence; and
create a fingerprint the chain, the fingerprint comprising all of the multiple links of the chain, in a unique temporal sequence.

19. The system of claim 18, wherein the controller module is further programmed to:
store the fingerprint for the chain in the cache.

20. The system of claim 18, wherein the controller module is further programmed to:
recognize that the chain is missing a removed link, has a defective link, or both, as a function of the fingerprint of the chain, and generating a notification based thereon.

* * * * *